US010229493B2

United States Patent
Garnavi et al.

(10) Patent No.: US 10,229,493 B2
(45) Date of Patent: Mar. 12, 2019

(54) JOINT SEGMENTATION AND CHARACTERISTICS ESTIMATION IN MEDICAL IMAGES

(71) Applicant: International Business Machines Corporation, Armonk, NY (US)

(72) Inventors: Rahil Garnavi, Macleod (AU); Dwarikanath Mahapatra, Melbourne (AU); Pallab K. Roy, Melbourne (AU); Suman Sedai, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 15/234,426

(22) Filed: Aug. 11, 2016

(65) Prior Publication Data

US 2017/0270671 A1  Sep. 21, 2017

Related U.S. Application Data

(60) Provisional application No. 62/309,083, filed on Mar. 16, 2016.

(51) Int. Cl.
   *G06T 7/00* (2017.01)
   *G06T 7/11* (2017.01)
   *G06T 7/187* (2017.01)
   *G06K 9/00* (2006.01)
   *G06K 9/34* (2006.01)

(52) U.S. Cl.
   CPC .......... *G06T 7/0012* (2013.01); *G06K 9/0061* (2013.01); *G06K 9/34* (2013.01); *G06T 7/11* (2017.01); *G06T 7/187* (2017.01); *G06T 2207/20081* (2013.01); *G06T 2207/20156* (2013.01); *G06T 2207/30041* (2013.01)

(58) Field of Classification Search
   CPC ......... G06T 7/0012; G06T 7/187; G06T 7/11; G06T 2207/20081; G06T 2207/20156; G06T 2207/30041; G06K 9/0061; G06K 9/34

See application file for complete search history.

(56) References Cited

U.S. PATENT DOCUMENTS

| 7,840,051 B2 | 11/2010 | Razeto |
| 8,675,931 B2 | 3/2014 | Ye et al. |

(Continued)

OTHER PUBLICATIONS

Afshin, M., et al., "Global Assessment of Cardiac Function Using Image Statistics in MRI", MICCAI 2012, Part II, LNCS, Oct. 2012, pp. 535-543, vol. 7511.

(Continued)

*Primary Examiner* — Kim Y Vu
*Assistant Examiner* — Molly Delaney
(74) *Attorney, Agent, or Firm* — Scully, Scott, Murphy & Presser, P.C.; David M. Quinn, Esq.

(57) ABSTRACT

Jointly determining image segmentation and characterization. A computer-generated image of an organ may be received. Organ characteristics estimation may be performed to predict the organ characteristics considering organ segmentation. Organ segmentation may be performed to delineate the organ in the image considering the organ characteristics. A feedback loop feeds the organ characteristics estimation to determine the organ segmentation, and feeds back the organ segmentation to determine the organ characteristics estimation.

20 Claims, 4 Drawing Sheets

(56) References Cited

U.S. PATENT DOCUMENTS

| | | |
|---|---|---|
| 2004/0208341 A1 | 10/2004 | Zhou et al. |
| 2005/0031202 A1 | 2/2005 | Accomazzi et al. |
| 2007/0081712 A1 | 4/2007 | Huang et al. |
| 2008/0188762 A1 | 8/2008 | John et al. |
| 2013/0121549 A1 | 5/2013 | Pekar et al. |
| 2013/0208961 A1 | 8/2013 | Nieminen et al. |
| 2016/0217567 A1 | 7/2016 | Keuchel et al. |
| 2016/0300351 A1* | 10/2016 | Gazit .................. G06T 7/11 |
| 2017/0046839 A1* | 2/2017 | Paik ................ G06K 9/00147 |

OTHER PUBLICATIONS

Almazroa, A., et al., "Optic Disc and Optic Cup Segmentation Methodologies for Glaucoma Image Detection: A Survey", Journal of Ophthalmology, Sep. 2015, pp. 1-28, vol. 2015.

Aquino, A., et al., "Detecting the Optic Disc Boundary in Digital Fundus Images Using Morphological, Edge Detection, and Feature Extraction Techniques", IEEE Transactions on Medical Imaging, Nov. 2010, pp. 1860-1869, vol. 29, No. 11.

Cao, X., et al., "Face Alignment by Explicit Shape Regression", International Journal of Computer Vision, Apr. 2014, 8 pages, vol. 107, Issue 2.

Chakravarty, A., et al., "Coupled Sparse Dictionary for Depth-based Cup Segmentation from Single Color Fundus Image", MICCAI 2014, Sep. 2014, 8 pages, vol. 8673.

Cheng, J., "Superpixel Classification Based Optic Disc and Optic Cup Segmentation for Glaucoma Screening", IEEE Transactions on Medical Imaging, Jun. 2013, pp. 1019-1032, vol. 32, No. 6.

Dollar, P., et al., "Cascaded Pose Regression", Proceedings / CVPR, IEEE Computer Society Conference on Computer Vision and Pattern Recognition, IEEE Computer Society Conference on Computer Vision and Pattern Recognition, Jun. 2010, 8 pages.

Friedman, J., "Greedy Function Approximation: A Gradient Boosting Machine", IMS 1999 Reitz Lecture, Feb. 24, 1999, Last modified Apr. 19, 2001, 39 pages.

Joshi, G.D., et al., "Optic Disk and Cup Segmentation From Monocular Color Retinal Images for Glaucoma Assessment", IEEE Transactions on Medical Imaging, Jun. 2011, pp. 1192-1205, vol. 30, No. 6.

Mitchell, S.C., "Multistage Hybrid Active Appearance Model Matching: Segmentation of Left and Right Ventricles in Cardiac MR Images", IEEE Transactions on Medical Imaging, pp. 415-423, May 2001, vol. 20, No. 5.

Moolan-Feroze, O., et al., "Segmentation of the Right Ventricle Using Diffusion Maps and Markov Random Fields", MICCAI 2014, Part I, LNCS, Sep. 2014, pp. 682-689, vol. 8673.

Sedai, S., et al., "Segmentation of Right Ventricle in Cardiac MR Images using Shape Regression", Machine Learning in Medical Imaging, LNCS, Oct. 2015, 8 pages, vol. 9352.

Sivaswamy, J., et al., "A Comprehensive Retinal Image Dataset for the Assessment of Glaucoma from the Optic Nerve Head Analysis", JSM Biomedical Imaging Data Papers, Mar. 2015, 7 pages.

Tan, M.H., et al., "Automatic Notch Detection in Retinal Images", 2013 IEEE 10th International Symposium on Biomedical Imaging, Apr. 2013, 4 pages.

Zhen, X. et al. "Direct Estimation of Cardiac Bi-ventricular Volumes with Regression Forests", MMICCAI 2014, LNCS Sep. 2014, 8 pages, vol. 8674.

Zuluaga, M.A., "Automatic Right Ventricle Segmentation using Multi-Label Fusion in Cardiac MRI", MICCAI 2012, Oct. 2012, 8 pages.

\* cited by examiner

JOINT SEGMENTATION AND CHARACTERISTICS ESTIMATION IN MEDICAL IMAGES

CROSS-REFERENCE TO RELATED APPLICATIONS

This application claims the benefit of U.S. Provisional Application No. 62/309,083, filed on Mar. 16, 2016, which is incorporated by reference herein in its entirety.

FIELD

The present application relates generally to computers and computer applications, and more particularly to computer-implemented imaging techniques, computer graphics and machine learning.

BACKGROUND

Image segmentation is the process of delineating structures of interest from a given image. This involves labeling objects in image or finding boundaries enclosing different organs in images. The segmentation of the organs is prerequisite to estimate the organ characteristics. The derived organ characteristics can be used for quantitative analysis of the organ including disease diagnosis. For example, in cardiac domain, the organ of interest can be left and right ventricle and the characteristics could be ejection fraction, myocardial motion, ventricle volumes, and/or others. These characteristics could be used for quantitative analysis of cardiac function as well as diagnosis of various cardiac diseases. In another example, in retinal imaging domain, the organ of interest could be optic cup and optic disc and the characteristics could be cup-to-disc-ratio and notching. These characteristics could be used to diagnose the glaucoma disease. In clinical studies the segmentation task is often performed manually, which is not only tedious and time-consuming but also suffers from inter and intra-observer variability.

BRIEF SUMMARY

A computer-implemented method and system of jointly determining image segmentation and characterization may be provided. A computer-generated image of an organ may be received. Organ characteristics estimation may be performed to predict the organ characteristics considering organ segmentation. Organ segmentation may be performed to delineate the organ in the image considering the organ characteristics. A feedback loop feeds the organ characteristics estimation to determine the organ segmentation, and feeds back the organ segmentation to determine the organ characteristics estimation.

In another aspect, a computer-implemented method of jointly determining image segmentation and characterization may include training an organ characteristics computer model that predicts a characteristic of an organ from a given image of the organ and a shape boundary of the organ in the given image. The organ characteristics computer model may be trained based on ground truth training images, shapes and organ characteristics. The method may also include training a segmentation computer model comprising an ensemble of shape regressors that predicts an organ segmentation, given the training images, initial seed segmentations and the trained organ characteristics computer model. The training of the segmentation computer model may include extracting image features relative to the previous segmentation. The training of the segmentation computer model may also include executing the organ characteristics computer model that predicts the characteristic of the organ. The training of the segmentation computer model may also include augmenting the image features with the characteristic of the organ predicted by the organ characteristics. The shape regression computer model may be trained to map the augmented image features to a shape difference vector. The training of the segmentation computer model may also include adding the trained shape regression model to the ensemble. The training of the segmentation computer model may also include repeating the extracting, executing, the augmenting and the adding in training the segmentation computer model until a training error is less than a preselected threshold value.

An image processing system that jointly determines image segmentation and characterization, in one aspect, may include at least one hardware processor operable to train an organ characteristics computer model that predicts a characteristic of an organ from a given image of the organ and a shape boundary of the organ in the given image. The organ characteristics computer model may be trained based on ground truth training images, shapes and organ characteristics. The at least one hardware processor may be further operable to train a segmentation computer model comprising an ensemble of shape regressors that predicts an organ segmentation, given the training images, initial seed segmentations and the trained organ characteristics computer model. The at least one hardware processor may train the segmentation computer model by at least extracting image features relative to the previous segmentation, executing the organ characteristics computer model that predicts the characteristic of the organ, augmenting the image features with the characteristic of the organ predicted by the organ characteristics, wherein the shape regression computer model is trained to map the augmented image features to a shape difference vector, and adding the trained shape regression model to the ensemble. The extracting, executing, the augmenting and the adding may be repeated in training the segmentation computer model until a training error is less than a preselected threshold value.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

System, method and techniques may be provided that improve and expedite image segmentation process, for example, an automatic and robust approach of segmenting organs in medical images and predicting the characteristics. In one embodiment, a system and/or associated methods may jointly segment organs and estimate their characteristics in coupled manner. The system and/or method of the present disclosure in one embodiment take into account the correlation between the segmentation and organ characteristics, and/or the interdependency between organ characteristics and organ segmentation. Organ segmentation and organ characteristics are related as organ segmentation is dependent on organ characteristics and organ characteristics can be more accurately predicted when organ segmentation is taken into account. The system and/or method of the present disclosure in one embodiment may interweave the organ segmentation and organ characteristics estimation together to improve the accuracy of both organ segmentation and organ characteristics estimation by exploiting their interdependency.

The system and/or method of the present disclosure in one embodiment may perform joint organ segmentation and characteristics estimation. In one embodiment, a system may include two subsystems. First subsystem may perform organ characteristics estimation by taking organ segmentation into account. The second subsystem may perform organ segmentation by taking organ characteristics into account. These two subsystems are connected in feedback loop so that output of organ characteristics estimation is fed to organ segmentation and output of organ segmentation is fed into organ characteristics estimation coupling the two subsystems together. An advantage of this framework is that it allows one to reinforce the estimation of others.

Figure 1:
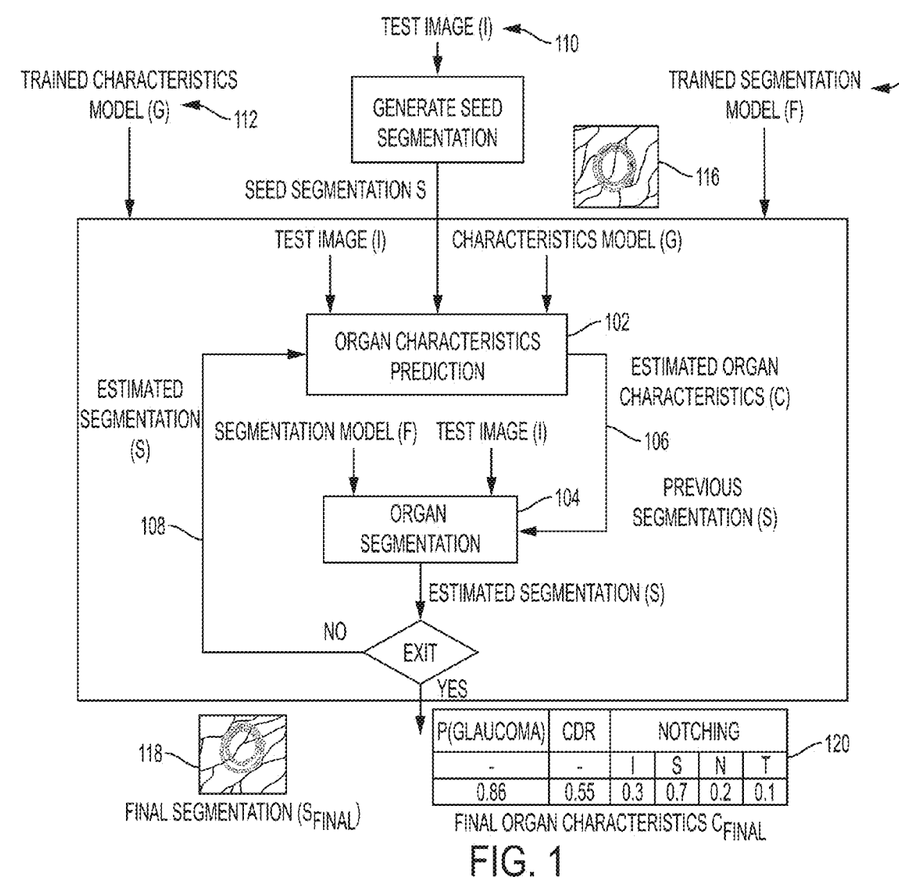
FIG. 1 is a diagram illustrating a system and a process that simultaneously segments the organs and estimates their characteristics in images in a coupled manner in one embodiment of the present disclosure.

FIG. 1 is a diagram illustrating a system and a process that simultaneously segments the organs and estimates their characteristics in medical images in a coupled manner in one embodiment of the present disclosure. The system in one embodiment may include a subsystem 102 that performs organ characteristics estimation to predict the organ characteristics from a given image by taking organ segmentation into account. In this way, in one embodiment, the organ characteristics guided not only by image but also by organ segmentation. The system may also include a subsystem 104 that performs organ segmentation, to delineate the organ in the given image by taking organ characteristics into account. In this way, in one embodiment, the organ segmentation subsystem is guided by the organ characteristics.

A feedback loop connects subsystems 102 and 104 so that the output of organ characteristics estimation subsystem 102 is fed to the organ segmentation subsystem 104 and vice versa as shown at 106 and 108, thereby interweaving them together for mutual feedback. In one embodiment, organ segmentation is guided by the organ characteristics and at the same time organ characteristics is derived from organ segmentation, coupling the two subsystems 102 and 104 together. The mutual feedback between the two subsystems reinforces one to correct and/or guide the other. This interweaving of segmentation and characteristics estimation allows one subsystem to improve the other in iterative manner.

Figure 2:
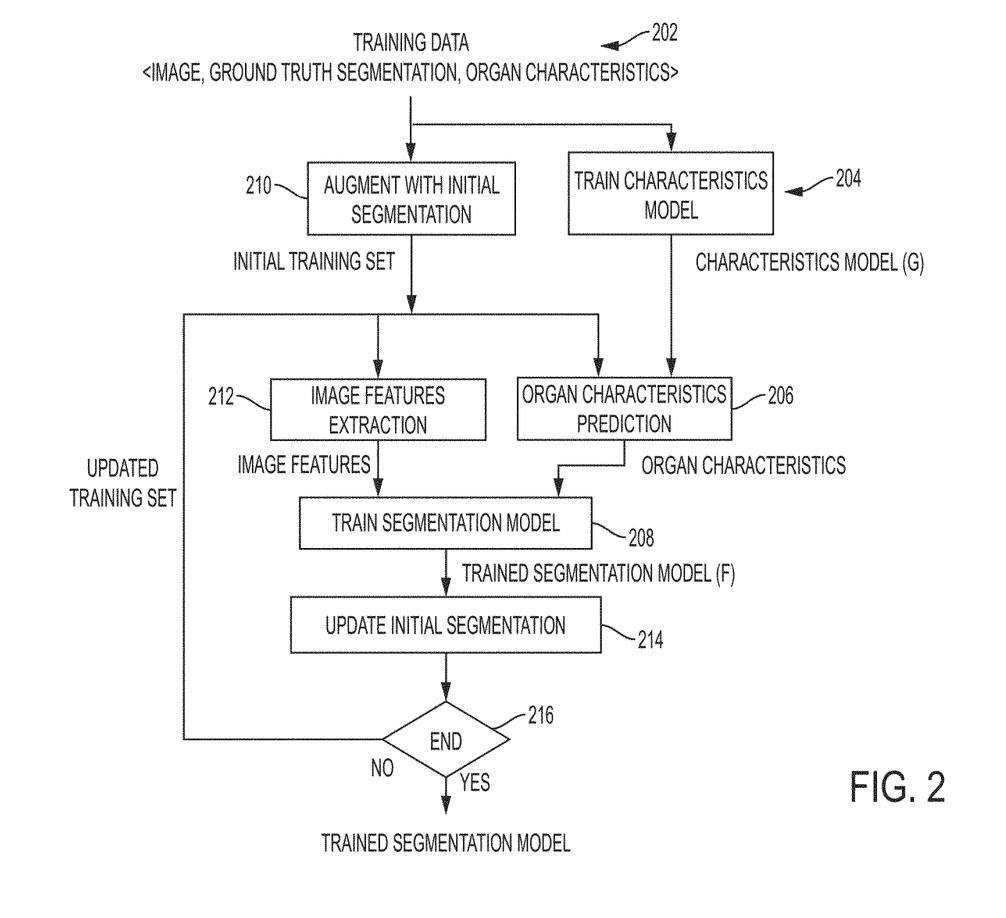
FIG. 2 is a diagram illustrating training of segmentation and characteristic prediction subsystems in one embodiment of the present disclosure.

FIG. 2 is a diagram illustrating training of the system described with reference to FIG. 1 in one embodiment of the present disclosure. The training in one embodiment may include training and/or tuning the organ characteristics estimation system in context of organ segmentation. In one embodiment, the features are computed relative to the organ segmentation and organ shape is considered also as a part of features.

The training in one embodiment may also include training and/or tuning organ segmentation system in context of organ characteristics. In one embodiment, organ characteristics are used in conjunction with image features to iteratively learn the organ segmentation model. In one embodiment, the training is done iteratively so as to improve from a seed segmentation to the final segmentation by taking into account both image and organ characteristics.

The system, for example, shown in FIG. 1 may perform organ segmentation and characteristics estimation jointly and simultaneously in iterative manner using the trained coupled system, for example, trained according to a method shown in FIG. 2. Given an image, the system in one embodiment may automatically compute both organ characteristics and organ segmentation in incremental fashion by leveraging one to estimate the other.

Given a test image, the system in one embodiment of the present disclosure iteratively and incrementally estimates the organ characteristics and organ segmentation starting with a seed segmentation. At each iteration, the system first estimates the organ characteristics from the given organ segmentation. The estimated organ characteristics are then used to segment the organ. The system progressively improves the estimation of organ characteristics and organ segmentation by leveraging one component to estimate the other. In one embodiment, both organ characteristics estimation model and organ segmentation model are trained using supervised learning algorithm.

The system and/or method of the present disclosure in one embodiment provide simultaneous segmentation and characteristics estimation. The system and/or method of the present disclosure in one embodiment utilizes the synergy between the organ characteristics and organ segmentation as it leverages organ characteristics for organ segmentation and organ segmentation for organ characteristic estimation. As a result, the system and/or method of the present disclosure in one embodiment can provide more robust segmentation and characteristics estimation. The system and/or method of the present disclosure in one embodiment uses supervised learning for segmentation and characteristics estimation, therefore, once the system is trained, the system provides faster segmentation.

In one embodiment of the present disclosure, an organ segmentation is denoted as a shape encompassing the organ boundary and is represented as a collection of landmark points. Referring to FIG. 1, the system in one embodiment of the present disclosure includes an organ characteristics model 102 and an organ segmentation model 104. In one embodiment, the organ characteristics model 102 predicts organ characteristics given an image and associated organ segmentation. In one embodiment, the organ segmentation model 104 segments organ given an image by taking into account organ characteristics.

Referring to FIG. 2, the system and/or method of the present disclosure in one embodiment includes training of the organ characteristics model 102 and the organ segmentation model 104. Training data may include set of images, ground truth segmentation of the organ and its characteristics $\{I_i, S_{gi}, c_i\}$ as shown at 202. In one embodiment, the ground truth segmentation is provided in terms of boundary points as a shape vector. In one embodiment, the ground truth organ characteristics $c_i$ is given as a vector. For example, to segment the optic cup and disc in retinal fundus images, the organ characteristics could be cup-to-disc-ratio, disease presence such as glaucoma and presence of notching. The training aims to learn a segmentation model that takes an initial shape and predicts the final shape of the organ with its characteristics.

The following describes training the organ characteristics model in one embodiment of the present disclosure. This process trains a predictive model at 204 (also referred to as process 1) that estimates the organ characteristics from a given image and a shape boundary. The system and/or method in one embodiment of the present disclosure learns this model from the ground truth training images, shapes and associated organ characteristics. The system and/or method in one embodiment of the present disclosure extracts image features inside the region enclosed by shape boundary points. Local image features based on SIFT, Local Binary patterns, and/or other methods, may be computed and then aggregated using dictionary learning techniques to obtain a compact feature representation. In one embodiment, the shape points are normalized and concatenated with image feature to form a final feature vector. In one embodiment, a regression or classification functions are then trained to map from the feature space to the organ characteristic space. The organ characteristics may be the continuous variable or the image level decision on whether the image contains certain disease or not. In one embodiment, if the characteristics are discrete, a classifier is trained. In one embodiment, if the characteristics are continuous a regressor is trained. The trained characteristics prediction model can be written as following equation: C=G (I, S).

The following describes training the organ segmentation model in one embodiment of the present disclosure. At 208, a process (also referred to as process 2), trains a segmentation model that predicts an organ segmentation given an image, previous segmentation and the organ characteristics. In one embodiment, the system and/or method in one embodiment of the present disclosure may adopt regression as the organ segmentation model to predict the shape boundary of the organ. In one embodiment, the organ shape regression may be modelled as ensemble of K regressors. Another predictive model or methodology may be utilized.

Referring to 210, data augmentation may be performed (also referred to as process 2.1): In one embodiment, a part of the training data includes image and shape pairs. The system and/or method of the present disclosure in one embodiment may use greedy approach to progressively learn the final segmentation from a given segmentation. The segmentation model learns to advance from any given initial shape to the true segmentation. In order to train the model, the system and/or method in one embodiment of the present disclosure augments each training sample with n number of random segmentations using the following steps. A shape distribution is constructed using a point distribution model using training shapes. Then each training sample is augmented by randomly sampling from the shape distribution. Therefore, now total number of training samples becomes $N_{ag}$=N*n. The augmented data includes $\{I_i, Sg_i, S_i\}$ i=1 . . . Nag.

Referring to 208, training of the regressors is performed (also referred to as process 2.2): A shape regressor in the present disclosure in one embodiment is based on ensemble of K regressors where each regressor in the ensemble predicts a shape increment vector. Each regressor in the ensemble is trained as follows in one embodiment:

Referring to 212, feature extraction may be performed (also referred to as process 2.2.1): Extract image features relative to the previous shape estimation. At first epoch, initial shape is taken as previous shape. A set of pixels are randomly sampled around a region of interest. The features locations are indexed with respect to the currently estimated shape rather than absolute image location. This allows the feature to be translation and rotation invariant. The difference between any two pixels is then taken as an image feature vector ($x_1$).

Referring to 206, organ characteristics are computed (also referred to as process 2.2.1.i) using the trained characteristic regression model at 204 (also referred to as process 1). The input to the trained characteristics prediction model is the currently estimated shape and an image which predicts a set of characteristics. These predicted characteristics may be regarded as a context feature vector ($x_2$). By using organ characteristics as a context feature, the final segmentation is more likely to match the target organ.

In a process (also referred to as process 2.2.1.ii), the context feature is augmented with image feature (e.g., from 212) by concatenating x1 (image feature 212) and x2 (organ characteristic 206) to form a final feature vector at this iteration i.e., x=[$x_1$, $x_2$]. The shape increment vector ΔS at this iteration is computed by subtracting the ground truth shape from the previous shape. The final feature vector and shape increment vector is computed for all the samples in the augmented training set.

(Process 2.2.2) Referring to 208, a regressor $R_t$ is trained that maps the combined feature vector x to the shape difference vector ΔS. A regression model such Random Forest, Gradient Boosting Machine can be used. At 214, once the regressor in the ensemble is trained, updating the current shape may be performed by adding the shape increment vector predicted by the trained ensemble.

(Process 2.2.3) At 216, if the termination criteria is not reached, the training process repeats (repeat process 2.2.1), for example, at 212, 206, 208 and 214. In one embodiment, the termination criteria may be triggered when the training error is less than a preselected threshold value. If the termination criteria is reached, the training process may stop. The output of the training is an ensemble regressor denoted by S=F (I, S, C).

The regressor in the ensemble in one embodiment answers the question what should be the next shape prediction given an image feature and the organ characteristics. Therefore, the shape prediction model not only matches the image observation but also the organ characteristics in order to segment the organ. The method improves the segmentation as it predicts the organ shape to match organ characteristics.

(Process 3) Given the trained models, the segmentation in test image may be predicted as shown in FIG. 1. Given a test image 110, the trained organ characteristics model 112 (process 1) and the trained segmentation model 114 (process 2), the system and/or method of the present disclosure in one embodiment segment the organ and predict its characteristics in coupled manner. In one embodiment, the joint prediction system of the present disclosure works with an initial segmentation (seed). For example, the system may compute the corresponding organ characteristics from the initial segmentation 116. Then, both organ segmentation and organ characteristics are iteratively updated and improved. The following describes testing phase in one embodiment of the present disclosure.

(Process 3.1) Shape Initialization 116: In order to initialize the shape, the system of the present disclosure in one embodiment may use two landmark points along the organ. A landmark detection algorithm can be used to detect the organ landmarks. The system of the present disclosure in one embodiment may first compute a mean shape by averaging all the segmentations in training set. The mean shape is then attached to the organ landmark. The attached shape is then regarded as an initial shape.

(Process 3.2) Organ Characteristics Prediction 102: In this step, in one embodiment, organ characteristics are estimated using the trained characteristics model (process 1)(e.g., described above with reference to FIG. 2). In one embodiment, the characteristics model takes an input image and an organ segmentation to predict the organ characteristics. As the organ segmentation is improved (process 3.3), the organ characteristics become more accurate.

(Process 3.3) Organ segmentation 104: In this step, in one embodiment, organ segmentation model (process 2)(e.g., described above with reference to FIG. 2) is used to estimate the organ segmentation from a given image and a previous shape. The organ segmentation model takes into account the organ characteristics estimated (process 3.2), to guide the segmentation to improve the previous segmentation. In doing so, the segmentation model extracts image features and regards the organ characteristics as context features. In one embodiment, both image features and context features are dependent on the previous segmentation. The trained regressor is then used to predict the next segmentation.

(Process 3.4) The processing at 102 and 104 repeats (e.g., repeat process 3.2 described above), feeding the output of one as an input to another, until all the regressors in the ensemble have been evaluated. The system outputs the segmented organ 118 and its characteristics 120.

The shown example image 118 is retinal fundus image where the target organ to segment is optic cup (inner boundary) and disc (outer boundary). Any other images may be input to the system for processing. The system may provide a user interface for displaying the output of the segmentation image, and associated characteristics. The system and/or method of the present disclosure may provide a feedback control system for training and/or testing (determining) image segmentation and characterization. The images in one embodiment of the present disclosure include machine generated images, for example, digital images.

For example, glaucoma is one of the leading causes of blindness. The manual examination of optic cup and disc is a standard procedure used for detecting glaucoma. The methodology of the present disclosure in one embodiment may provide a coupled regression for accurate segmentation of optic cup and disc in retinal colour fundus image. For instance, the method may be utilized to roughly segment optic disc using circular Hough transform. The approximated optic disc is then used to compute the initial optic disc and cup shapes. A coupled regression framework in one embodiment of the present disclosure may include a characteristics regressor which directly predicts cup-to-disc ratio (cdr) from a given image and an ensemble shape regressor which iteratively estimates the OD-OC segmentation by taking into account the cdr estimated by the characteristics regressor. The characteristics regressor and the shape regressor are then coupled together in the feedback loop so that estimation of one reinforces the other. In one embodiment, Gaussian process regression can be used to model the characteristics regressor, whereas the ensemble shape regression can be modelled using boosted regression trees.

Glaucoma is a chronic and irreversible neurodegenerative ocular disorder in which the optic nerve head is progressively damaged, leading to deterioration in vision and quality of life. Glaucoma is commonly asymptomatic. The patients may experience a noticeable visual loss only at a later stage. Over a period of 5 years, the optic nerve fiber loss progression in glaucoma can range from 9% to 63%. As the lost capabilities of the optic nerve cannot be recovered, early detection and treatment are essential for glaucoma patients to reduce the progression of their vision loss.

Glaucoma diagnosis mainly depends on the medical history, intra-ocular pressure and visual field loss tests together with a manual assessment of the Optic Disc (OD) through ophthalmoscopy. OD is the location where ganglion cell axons exit the eye to form the optic nerve, through which visual information of the photo-receptors is transmitted to the brain. In 2D (two dimensional) color retinal fundus images, the OD can be divided into two distinct regions; namely, a central bright region called the optic cup (OC) (in short, cup) and a peripheral region called the neuroretinal rim. The loss in optic nerve fibers leads to a change in the structural appearance of the OD, namely, the enlargement of cup region called cupping. Since one of the important indicators is the enlargement of the cup with respect to OD, various parameters are considered and estimated to detect the glaucoma, such as the vertical cup to disc ratio (CDR), disc diameter, ISNT rule, and peripapillary atrophy.

Retinal 2D fundus images are mainly used for the early prediction of glaucoma. The loss in the optic nerve fiber has a direct effect on the neuro-retinal rim configuration resulting in a quantifiable geometric parameters related to optic disc, optic cup and neuro-retinal rim such as Cup-to-Disc ratio (CDR). Quantification of CDR requires precise information of the boundaries of the optic disc (OD) and the optic cup (OC). Manual annotation of the optic cup and disc boundary is time consuming, expensive and highly subjective.

A number of automatic methods have been presented in the literature for the automatic segmentation of the optic cup and disc. Current state-of-the-art methods for optic disc segmentation use morphological features and active contours. However, their performance depends upon initialization and ability to identify weak edges. Optic cup segmentation from retinal fundus image is challenging because the depth information is not available in 2D fundus images. Moreover, the presence of ill defined and inhomogeneous optic cup boundary makes the problem more difficult. Existing approaches of optic cup segmentation are based on level sets, superpixels classification and sparse dictionary learning. In another approach, fusion of cup segmentations from multi-view fundus images is performed to improve the performance. Recent method bypasses the segmentation of OD-OC altogether and directly predicts the presence of glaucoma from the fundus image by directly classification using SVM and deep learning.

The methodology in one embodiment of the present disclosure may include a method based on couple estimation of CDR OD-OC segmentation by interweaving them together. Direct estimation of cdr may guide the segmentation of OD-OC and improve the segmentation performance. Moreover, the coupling of these two approaches can result in the segmentation of OD, OC and estimation of CDR simultaneously. A method in one embodiment of the present disclosure may combine the optic cup and disc segmentation and CDR estimation together to improve the accuracy of both OC and OD segmentation and CDR estimation by exploiting their interdependency. The method may include two separate regression models. For example, the first regression model is trained to estimate the CDR by directly regressing the image features in context to a given segmentation of OD. The second one is an ensemble shape regression model which iteratively builds strong regressor by cascading weak shape regressors. Each weak shape regressor is a function of a previous segmentation of cup and disc and estimated CDR value obtained from the CDR regression model. Once the regression model is trained, the method in one embodiment does not need optimization in testing phase, hence provides faster segmentation. The following describes a segmentation method, for example, applied to an example organ, an eye. Example experimental results are also demonstrated.

In one embodiment, the method may represent the optic disc and optic cup (OD-OC) shape as a collection of p landmark points $$S = \{x_i, y_i\}_{i=1}^{p}$$

and train a coupled cascade regression model that directly predicts the shape landmark location from an input image. The coupled cascade regression framework in one embodiment includes two separate regression models, an ensemble shape regression model and the CDR regression model. The CDR regression model is trained to predict the cup to disc ratio by directly regressing the image features in context to a given segmentation. The ensemble shape regressor (denoted by Equation 1Error! Reference source not found.) iteratively builds strong regressor by cascading T weak shape regressors $R_1, \ldots R_T$. Each weak shape regressor is a function of a previous segmentation and previous CDR and is trained to predict a shape increment vector ΔS to update the previous shape.

$$S^t = S^{t-1} + R^t(I, S^{t-1}, c^{t-1}) \quad (1)$$

$$c^{t-1} = F(I, S^{t-1}) \quad (2)$$

Given an image I and an initial OD-OC shape $S^0$ the method in one embodiment of the present disclosure jointly computes both OD-OC segmentation and CDR values in iterative fashion. The final segmentation always lies in the linear subspace of the training shapes as long as the initial shape $S^0$ is a valid OD-OC shape. Therefore, this approach automatically incorporates shape constraints in the learning. The segmentation method in one embodiment takes two insert point locations along the optic disc boundary for shape initialization. Coupled regression method is developed to jointly model CDR and the segmentation of disc and cup for capturing their inherent correlations to improve the segmentation. The shape regression takes into account not only the image but also the previous CDR to guide the segmentation. At the same time, the CDR estimator takes previous shape in order to improve the next cdr estimation. Therefore, Equation (1) and (2) are coupled together to form a mutual feedback mechanism. Given a training examples $$\{I_i, \hat{S}_i, c_i\}_{i=1}^{n}$$

where $I_i$ is a retinal fundus image and $\hat{S}_i$ is a ground truth OD-OC shape vector and $c_i$ is the cup to disc ratio, the goal is to learn the CDR estimator F and the ensemble regressors $R_1, \ldots R_T$.

CDR Estimation

The CDR estimator takes an image I to directly predict cup to disc ratio parameter. First, the previous shape estimation is used to segment the disc image. Then an effective feature representation is used to capture features that are related to optic cup and optic disc. In one embodiment, the location of the disc and cup are the main underlying cues that determine the cup to disc ratio. Therefore, the spatial structures are very useful in suggesting the cup to disc ratio. The method in one embodiment uses multi-scale histogram local binary patterns with spatial pyramid to extract the features. The method in one embodiment computes local binary pattern (LBP) histogram at two level of spatial pyramid. Let w and h denote the width and the height of the image. In the first level, the multi-scale local binary pattern (MSLBP) histogram is computed in a block where the block covers the entire image. In the second level, MSLBP histogram is computed across the 9 overlapping blocks with size of w/2, h/2 which are obtained by moving a block along x axis with increment of w/4, and along y-axis with increment of h/4. Therefore, the total number of blocks is 10. The MSLBP feature computed in all the spatial pyramid blocks are then concatenated to form a single feature vector which the method names as MSLBP-SP.

Gaussian Process (GP) regression model is used to predict the cdr from the MSLBP-SP features. GP defines a distribution over function f, where f is a mapping from the input feature space X to c, such that for any finite subset of X, its marginal distribution P(f(x1), f(x2), ... f(xn)) is a multivariate normal distribution, where x an input vector. Gaussian Process is parameterized by its mean function m(x) and covariance function $k(x_i, x_j)$ such that $$f(x) = N(m(x), K(X,X)) \quad (3)$$

where X is a design matrix with each row as input vectors and K(X,X) denotes n×n matrix of covariances such that $K_{i,j} = k(x_i, x_j)$. Once trained, the mean function gives the cdr estimation and covariance function gives the confidence of the estimation. The method then uses both the cdr estimation and the confidence value to segment the OD-OC (described in Shape regression below). The method in one embodiment uses confidence value from GPR so that the derived feature is not selected when the regressor provides low confidence estimation.

Shape Regression

In the ensemble regression in one embodiment, the ensemble learns to predict the final segmentation from an initial shape, therefore each training sample is augmented with multiple initial shapes. Each training example includes an initial shape to train the regression framework. For $i^{th}$ training sample, the method in one embodiment samples K training shapes from the remaining samples. The sampled shapes are then transformed to absolute image coordinates by attaching them to the OD insert points in $I_i$. Therefore, the effective number of training samples in the augmented training set becomes $N_{ag} = N*K$. The augmented training set to train the first regressor $F^1$ in the cascade includes $$\{I_i, \hat{S}_i, S_1^0\}_{i=1}^{N_{ag}}.$$

The augmented set is updated after each regressor in the cascade is trained. For example, in order to train the $t^{th}$ regressor in the cascade $F^t$, the augmented set is updated to form $$\{I_i, \hat{S}_i, S_1^{t-1}\}_{i=1}^{N_{ag}}$$

where $S_i^{t-1}$ is computed using Equation 1. Hereafter, $S_i^{t-1}$ is referred to as previous shape.

Feature Extraction: Two types of feature are computed for the $t^{th}$ regressor in the ensemble, image-based feature and the derived feature. The method in one embodiment uses the CDR estimator from CDR estimation described above to estimate the cup to disc ratio and the confidence score. The method in one embodiment takes the estimated cup to disc ratio and the confidence value as a derived feature.

To compute the image-based features, the method may randomly sample Q pixels locations $u_1, \ldots u_Q$ in the space of the mean OD-OC shape where each pixel $u_j$ is indexed by its nearest OD-OC shape landmark point $l_j$ using an offset vector $\delta_j = (\delta_X, \delta_y)$. Next, the pixels are transformed to the absolute image coordinate for each image $I_i$ in the training set as of $v_j^i = I_i(S_i^{t-1}(l_j) + R_i[\delta_j 1])$ where $S_i^{t-1}(l_j)$ denotes the image location of the $l_j^{th}$ landmark position with respect to the previous shape estimate $S_i^{t-1}$ and $r_j$ is a rotation matrix that transforms the mean shape to $S_i^{t-1}$. The elements in rotation matrix can be efficiently computed by minimizing the sum of square error between the mean shape landmark points and the landmark points in previous shape $S_i^{t-1}$. By this way, the pixel locations are indexed relative to the previously estimated shape $S_i^{t-1}$, rather than the original image coordinates. This leads to better geometric invariance against the shape variation, and in turn helps the regressors to converge more quickly. The features are then computed as intensity difference between any two pixels. The pixel difference features are not only cheap to compute but also they are insensitive to illumination variation in images. The method computes the difference between intensity values for any two pixel $v_j^i$ and $v_k^i$ for $j=1, \ldots Q$; $k=j, \ldots Q$ and $j \neq k$. The dimension of the pixel difference feature vector $x_i^t$ is therefore $Q(Q-1)/2$.

The feature parameters set $\{l_j, \delta_j\}_{j=1 \ldots Q}$ are retained as they are used in prediction phase to extract the features in the test image. The extracted feature vector $x^t$ is used to train the regressor $F^t$ in the ensemble.

Training the regressors: Given the augmented training data $$\{I_i, \hat{S}, S_i^{t-1}\}_{i=1}^{Nag},$$

each regressor $F^t$ in the ensemble is trained. For example, the method may first compute the shape index feature vector $x_i^t$ from $l_i$ using the previous shape estimate $S_i^{t-1}$ for all $i=1, \ldots N_{ag}$. The regressor $F^t$ is trained to minimize the difference between the ground truth shape and the shape computed by the previous cascade. The regressor $F^t$ is trained to map from the feature space $x^t$ to the target shape increment vector $\Delta S_i^t = \hat{S} - S_i^{t-1}$. In one embodiment, the regressor $F^t$ is trained using $$\{x_i^t, \Delta S_i^t\}_{i=1}^{Nag}$$

as follows.

The method may model the regressor $F^t$ using gradient boosting regression (GBR) with sum of square loss. GBR is an iterative process to build a strong regressor from several weak regressors, which can be expressed in the following additive form:

$$F_m^t(x^t) = F_{m-1}^t(x^t) + \gamma f_m^t(x^t) \quad (4)$$

where $F_m^t$ is a regressor obtained at $m^{th}$ iteration and $F_m^t$ is an incremental weak regressor by which $F_{m-1}^t$ should advance in order to minimize the expected value of the given loss function and $\gamma$ is a shrinkage parameter that determines contribution of weak regressor on the ensemble. The shrinkage parameter $0 < \gamma \leq 1$ controls the learning rate and selecting $\gamma < 1$ helps to prevent overfitting. The gradient boosting regression approximates $F_m^t$ in the path of the steepest descent, which is given by the residuals of the training samples. For the sum of square loss, residuals of the $i^{th}$ training sample is computed as $g_m(x_i^t) = \Delta S_i^t - F_{m-1}^t(x_i^t)$. Next, the weak regressor $F_m^t$ is trained using $$\{x_i^t, g_m(x_i^t)\}_{i=1}^{Nag}.$$

The weak regressor $f_m(x)$ is modeled as the multi-dimensional version of the regression tree. Regression tree recursively partitions the feature space into L disjoint regions $R_{l,m}, l=1 \ldots L$. Since the output shape increment vector $\Delta S \in R^P$ is multi-dimensional, each of the partition $R_{l,m}$ in the terminal nodes of the tree is represented by a P-dimensional constant response vector. To train the regression tree, best feature dimension and the split at each node is selected by minimizing the sum of the squared deviations about the mean of $g_m(x_i^t)$ for all i that belongs to the partition denoted by the node. The split can be found very efficiently as the response vector for the candidate partitions resulting from the splits can be computed as a mean of the residuals in the partitions i.e, $\gamma_l^m = \sum_{x^j \in R_{l,m}} g_m(x_i^t) / N_{lm}$, where $N_{lm}$ is the number of training samples that falls in the partition $R_{l,m}$.

Prediction

Given a test retinal fundus image, first the method may detect the optic disc region using the Hough transform based method for initial localization (automatic feature learning). The method may then use mean shape computed from the training shapes S as an initial shape by transforming the mean shape to fit in OD bounding box. The transformed mean shape is taken as an initial shape and is fed to the trained coupled regression system to obtain the final segmentation in an iterative manner. At each iteration, cdr value is estimated using the trained cdr regressor. The estimated cdr value is then fed into the trained ensemble shape regressor to update the initial segmentation of OD-OC. After T iterations, the method in one embodiment of the present disclosure obtains the final segmentation of OD-OC and the estimated cdr value.

In one embodiment, the trained ensemble contains a set of regressors. In prediction stage, in one embodiment of the present disclosure, all the regressors in the ensemble are used. Given an initial shape and an image, the first regressor updates and/or changes the initial shape. The updated shape/segmentation is fed to the second regressor and the process continues until all the regressors in the ensemble are covered. In one embodiment, the output of the last regressor is taken as the final segmentation.

Experiments

The method is evaluated on a set of 50 retinal images. For training and evaluation purpose, ground truth segmentation mask of optic disk and optic cup is provided. Evaluation is performed for the segmentation approach on the images set using 5-fold cross validation using holdout method. First, the images set is divided into 5 sub sets and holdout method is repeated 5 times, each time one of the 5-subsets is used as the test set and other 4-subsets are put together to form a training set. Then the average segmentation performance across all 5 test sets is computed. For the training purpose, the segmentation mask is converted to the boundary points by taking two insert points as a reference. The number of cascade regressors is empirically set to T=20. To ensure each landmark $(x_j, y_j)$ of all the training shapes represents approximately same location in the right ventricle boundary, the first landmark $x_1, y_1$ is taken to be the left insert point of the OD and $q^{th}$ landmark point is taken to be the second insert point of the OD.

Algorithm 1: Training Steps of a Coupled Regression Method for OD-OC Segmentation in One Embodiment.

1. Given a set of training images and training shapes $$\{I_i, \hat{S}_i, \hat{c}_i\}_{i=1}^{N}$$

2. Train a CDR estimator as described in CDR estimation
3. Augment the data as $$\{I_i, \hat{S}_i, S_i^0\}_{i=1}^{N_{ag}}$$

described in Shape regression
4. For t=1 . . . T
   (a) Compute the image-based feature vector $x_i^t$ for each augmented sample
   (b) Estimate the cdr using the trained estimator $c_i^t = F(I, S_i^{t-1})$
   (c) Compute the shape increment vector $\Delta S_i^t \hat{S}_i, -S_i^{t-1}$ for i=1 . . . $N_{ag}$
   (d) Train the regressor $F^t$ using the training data $$\{c_i^t, x_i^t, \Delta S_i^t\}_{i=1}^{N_{ag}}$$

(e) Update $S_i^t$ in the augmented set using the trained ensemble for i=1, . . . $N_{ag}$ The predicted disc and cup boundaries are converted to segmentation mask for evaluation. The segmentation performance is measured in terms of F-score of the pixel labels between the automatic segmentation mask and manual segmentation mask using the formula F=2pr/(p+r) where p is the precision and r is the recall. From the performance of the method, it can be observed that the average F-score of the method is 0.95 for optic disc. It is observed that the F-score of 0.86 for optic cup segmentation.

Figure 4:
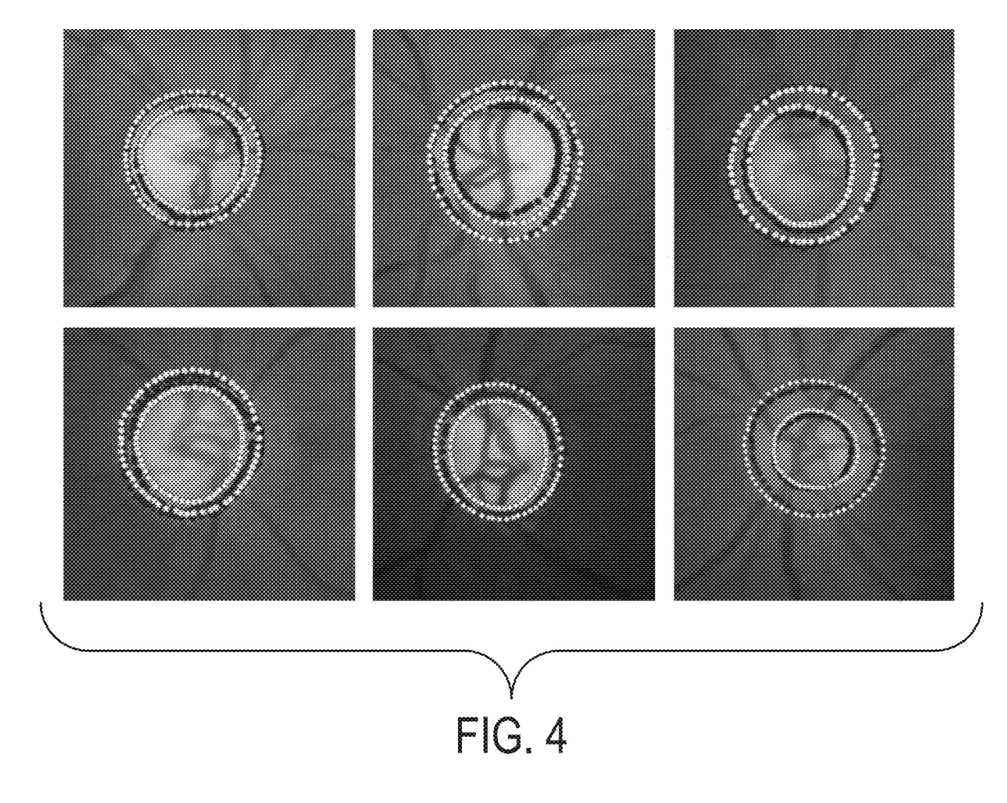
FIG. 4 shows the segmentation output of the method of the present disclosure in one embodiment and corresponding manual segmentations for both optic disc (outer boundary) and optic cup (inner boundary).

FIG. 4 shows the segmentation output of the method of the present disclosure in one embodiment and corresponding manual segmentations for both optic disc (outer boundary) and optic cup (inner boundary). The manual segmentations are outlined in dark color and automatic segmentation are lighter color.

In one embodiment, the segmentation method is implemented in JAVA, and experiments are performed on an Intel Core i7 CPU @ 2.6 GHz with 16 Gb of memory. The method took 150 milliseconds to segment both OD and OC in retinal fundus images after the OD insert points have been detected.

A coupled regression method in one embodiment of the present disclosure simultaneously segments an image, for example, optic disc/cup and estimates image characteristic, for example, the cup-to-disc-ratio in retinal fundus images. The characteristics regressor is trained to predict the characteristic, for example, cdr, directly from image feature. The segmentation model in one embodiment to predict the image shape, for example, the OD-OC shape includes ensemble of non-linear regressors that takes into account the characteristic, for example, cdr, estimated by the characteristics regressor. The method in one embodiment starts with an initial shape which is iteratively updated by each regressor in the cascade to obtain a final shape. The method in one embodiment models each regressor in the cascade using gradient boosting regression.

In one embodiment, graphical user interface may be provided that displays on a display device the segmentations. The graphical user interface may be interactive, for example, display change in segmentation based on the results of the ensemble of regressors.

Figure 3:
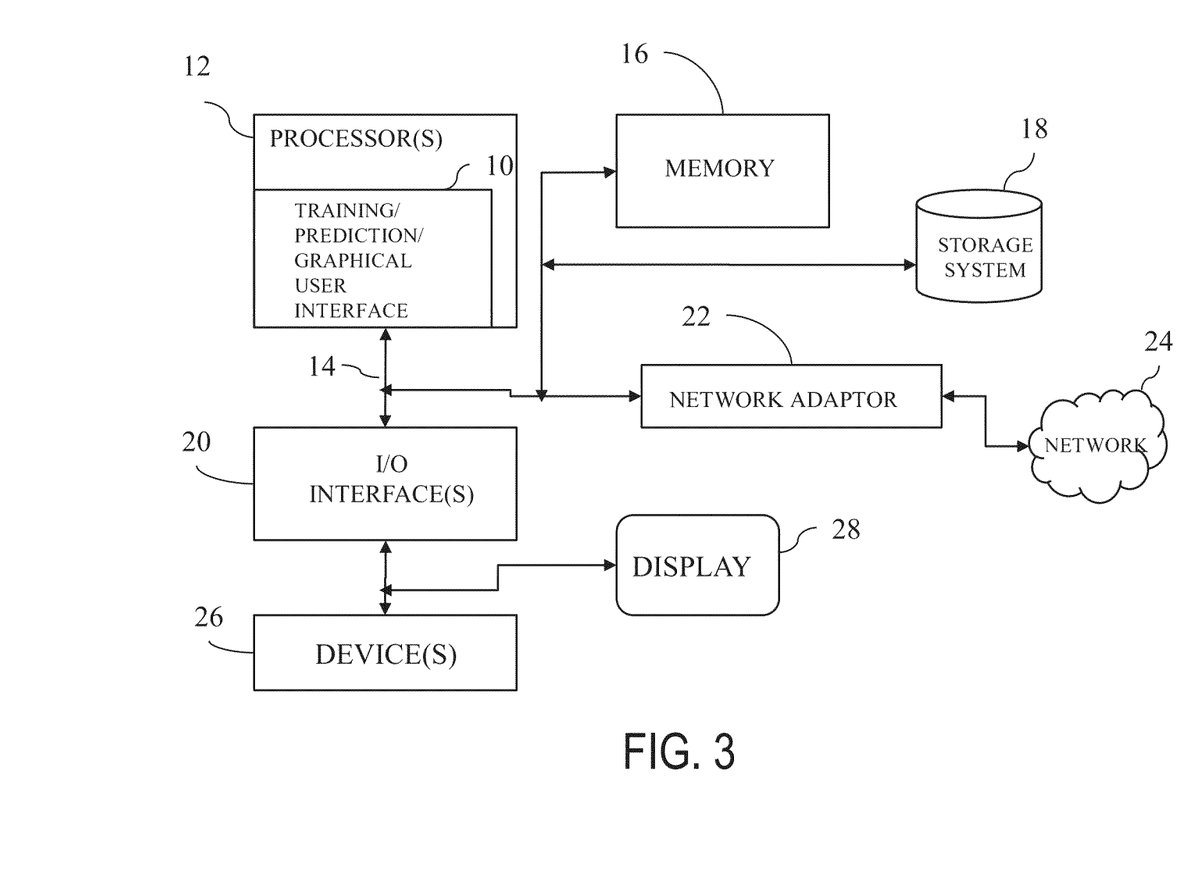
FIG. 3 illustrates a schematic of an example computer or processing system that may implement a system in one embodiment of the present disclosure.

FIG. 3 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a training and/or prediction modules 10 that perform the methods described herein. The modules 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of jointly determining image segmentation and characterization, the method performed by one or more processors, the method comprising:

training an organ characteristics computer model that predicts a characteristic of an organ from a given image of the organ and a shape boundary of the organ in the given image, the organ characteristics computer model trained based on ground truth training images, shapes and organ characteristics;

training a segmentation computer model comprising an ensemble of shape regressors that predicts an organ segmentation, given training images, initial seed segmentations and the trained organ characteristics computer model, the training the segmentation computer model comprising:

extracting image features relative to a previous segmentation;

executing the organ characteristics computer model that predicts the characteristic of the organ;

augmenting the image features with the characteristic of the organ predicted by the organ characteristics computer model, a shape regressor trained to map the augmented image features to a shape difference vector;

adding the trained shape regressor to the ensemble; and repeating the extracting, executing, the augmenting and the adding in training the segmentation computer model until a training error is less than a preselected threshold value.

2. The method of claim 1, further comprising:

receiving a test image and an initial segmentation data;

estimating test image organ characteristics by executing the organ characteristics computer model with the test image and the initial segmentation data as input;

estimating test image organ segmentation by executing the segmentation computer model with the test image, the initial segmentation data, and the test image organ characteristics.

3. The method of claim 1, wherein each regressor in the ensemble predicts a shape increment vector.

4. The method of claim 1, further comprising:

augmenting a training image with n number of random segmentations by randomly sampling from a shape distribution constructed using a point distribution model using the shapes associated with the training image.

5. The method of claim 1, wherein the extracted image features comprise a difference between two pixels in the image, feature locations associated with the image features indexed with respect to currently estimated shape.

6. The method of claim 2, wherein the organ comprises an eye and the organ characteristic comprises a cup-to-disc-ratio.

7. The method of claim 2, further comprising:

displaying the test image organ segmentation on a display device.

8. A non-transitory computer readable storage medium storing a program of instructions executable by a machine to perform a method of jointly determining image segmentation and characterization, the method comprising:

training an organ characteristics computer model that predicts a characteristic of an organ from a given image of the organ and a shape boundary of the organ in the given image, the organ characteristics computer model trained based on ground truth training images, shapes and organ characteristics;

training a segmentation computer model comprising an ensemble of shape regressors that predicts an organ segmentation, given training images, initial seed segmentations and the trained organ characteristics computer model, the training the segmentation computer model comprising:

extracting image features relative to a previous segmentation;
executing the organ characteristics computer model that predicts the characteristic of the organ;
augmenting the image features with the characteristic of the organ predicted by the organ characteristics computer model,
a shape regressor trained to map the augmented image features to a shape difference vector;
adding the trained shape regressor to the ensemble; and
repeating the extracting, executing, the augmenting and the adding in training the segmentation computer model until a training error is less than a preselected threshold value.

9. The non-transitory computer readable storage medium of claim 8, further comprising:
receiving a test image and an initial segmentation data;
estimating test image organ characteristics by executing the organ characteristics computer model with the test image and the initial segmentation data as input;
estimating test image organ segmentation by executing the segmentation computer model with the test image, the initial segmentation data, and the test image organ characteristics.

10. The non-transitory computer readable storage medium of claim 8, wherein each regressor in the ensemble predicts a shape increment vector.

11. The non-transitory computer readable storage medium of claim 8, further comprising:
augmenting a training image with n number of random segmentations by randomly sampling from a shape distribution constructed using a point distribution model using the shapes associated with the training image.

12. The non-transitory computer readable storage medium of claim 8, wherein the extracted image features comprise a difference between two pixels in the image, feature locations associated with the image features indexed with respect to currently estimated shape.

13. The non-transitory computer readable storage medium of claim 9, wherein the organ comprises an eye and the organ characteristic comprises a cup-to-disc-ratio.

14. The non-transitory computer readable storage medium of claim 9, further comprising:
displaying the test image organ segmentation on a display device.

15. An image processing system that jointly determines image segmentation and characterization, comprising:
at least one hardware processor operable to train an organ characteristics computer model that predicts a characteristic of an organ from a given image of the organ and a shape boundary of the organ in the given image, the organ characteristics computer model trained based on ground truth training images, shapes and organ characteristics;
the at least one hardware processor further operable to train a segmentation computer model comprising an ensemble of shape regressors that predicts an organ segmentation, given training images, initial seed segmentations and the trained organ characteristics computer model, the at least one hardware processor training the segmentation computer model by at least:
extracting image features relative to a previous segmentation;
executing the organ characteristics computer model that predicts the characteristic of the organ;
augmenting the image features with the characteristic of the organ predicted by the organ characteristics computer model,
a shape regressor trained to map the augmented image features to a shape difference vector;
adding the trained shape regressor to the ensemble; and
repeating the extracting, executing, the augmenting and the adding in training the segmentation computer model until a training error is less than a preselected threshold value.

16. The system of claim 15, wherein the at least one hardware processor is further operable to receive a test image and an initial segmentation data, estimate test image organ characteristics by executing the organ characteristics computer model with the test image and the initial segmentation data as input, and estimate test image organ segmentation by executing the segmentation computer model with the test image, the initial segmentation data, and the test image organ characteristics.

17. The system of claim 15, wherein each regressor in the ensemble predicts a shape increment vector.

18. The system of claim 15, wherein the at least one hardware processor is further operable to augment a training image with n number of random segmentations by randomly sampling from a shape distribution constructed using a point distribution model using the shapes associated with the training image.

19. The system of claim 15, wherein the extracted image features comprise a difference between two pixels in the image, feature locations associated with the image features indexed with respect to currently estimated shape.

20. The system of claim 16, wherein the organ comprises an eye and the organ characteristic comprises a cup-to-disc-ratio, the at least one hardware processor is further operable to display the test image organ segmentation on a display device.

* * * * *